United States Patent
Beamish et al.

(10) Patent No.: US 10,419,061 B2
(45) Date of Patent: Sep. 17, 2019

(54) COMMUNICATIONS APPARATUS, COMMUNICATIONS SYSTEM AND METHOD OF DETERMINING SIGNAL ISOLATION

(71) Applicant: u-blox AG, Thalwil (CH)

(72) Inventors: Norman John Beamish, Cork (IE); James Connelly, Cork (IE)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 15/758,179

(22) PCT Filed: Sep. 15, 2015

(86) PCT No.: PCT/EP2015/071132
§ 371 (c)(1),
(2) Date: Mar. 7, 2018

(87) PCT Pub. No.: WO2017/045707
PCT Pub. Date: Mar. 23, 2017

(65) Prior Publication Data
US 2018/0254795 A1 Sep. 6, 2018

(51) Int. Cl.
*H04B 1/525* (2015.01)
*H04B 17/00* (2015.01)
(Continued)

(52) U.S. Cl.
CPC ......... *H04B 1/525* (2013.01); *H04B 17/0085* (2013.01); *H04B 17/19* (2015.01); *H04B 17/318* (2015.01); *H04B 1/1027* (2013.01)

(58) Field of Classification Search
CPC .. H04B 1/525; H04B 17/318; H04B 17/0085; H04B 17/19; H04B 1/1027
(Continued)

(56) References Cited

U.S. PATENT DOCUMENTS 9,496,620 B2 * 11/2016 Schulz .................. H01Q 15/16
2006/0244581 A1 * 11/2006 Breed .................. B60C 23/0408
340/447

(Continued)

OTHER PUBLICATIONS

ETSI: "LTE; Evolved Universal Terrestrial Radio Access (E-UTRA); User Equipment (UE) radio transmission and reception (3GPP TS 36.101 version 12.5.0 Release 12)", #GPP Standard, LTE Advanced, Nov. 1, 2014 (Nov. 1, 2014), pp. 74-77.

(Continued)

*Primary Examiner* — Chieh M Fan
*Assistant Examiner* — Fitwi Y Hailegiorgis
(74) *Attorney, Agent, or Firm* — Finnegan, Henderson, Farabow, Garrett & Dunner LLP

(57) ABSTRACT

A communications apparatus includes a hardware subsystem including a test signal control component, a duplexer component, and Radio Frequency processing components. The Radio Frequency processing components include a transmitter chain portion and a receiver chain portion having a signal sensitivity threshold associated therewith, to a receive side port of the duplexer component. The test signal control component is arranged to cooperate with the transmitter chain to generate a test signal. A portion of the test signal control component is leaked by the duplexer component. The test signal control component is also configured to ensure that any irradiated power of the test signal complies with the transmit OFF power threshold requirement and the portion of the test signal leaked is above the signal sensitivity threshold of the receiver chain portion.

20 Claims, 8 Drawing Sheets

(51) Int. Cl.
*H04B 17/19* (2015.01)
*H04B 17/318* (2015.01)
*H04B 1/10* (2006.01)

(58) Field of Classification Search
USPC .................................................. 375/345, 346
See application file for complete search history.

(56) References Cited

U.S. PATENT DOCUMENTS

2011/0299434 A1   12/2011   Gudem et al.
2014/0355456 A1   12/2014   Jiang et al.

OTHER PUBLICATIONS

International Search Report PCT/ISA/210 for International Application No. PCT/ep2015/071132 dated May 19, 2016.

* cited by examiner

COMMUNICATIONS APPARATUS, COMMUNICATIONS SYSTEM AND METHOD OF DETERMINING SIGNAL ISOLATION

FIELD OF THE INVENTION

The present invention relates to communications apparatus of the type that, for example, provides wireless network access in accordance with a communications standard that specifies a transmit OFF power threshold requirement. The present invention also relates to a communications system of the type that, for example, provides wireless network access in accordance with a communications standard that specifies transmit OFF power threshold requirement. The present invention further relates to a method of determining a signal leakage profile of a duplexer in a communications apparatus, the method being of the type that, for example, generates a test signal in a communications network operating in accordance with a communications standard.

BACKGROUND OF THE INVENTION

Communications systems that are reliant upon Orthogonal Frequency Division Multiplexing schemes, for example Long Term Evolution (LTE) communications systems, which are sometimes referred to as 4G communications systems, are known to employ base stations, sometimes referred to as evolved Node Bs (eNode Bs) capable of communicating with User Equipment (UE) units. The UE units are typically used by subscribers to one or more cellular communications services provided by a network infrastructure that comprises a plurality of the eNode Bs to support a respective plurality of notional cells that provide wireless communications coverage for the UEs over a geographic region. The eNode Bs and the UE units are examples of communications equipment that comprise modems.

In the UE unit, a baseband IC and a Radio Frequency (RF) IC together support a transceiver architecture having a transmitter chain and a receiver chain that support operation in accordance with the different variants of the Orthogonal Frequency Division Multiplexing (OFDM) communications scheme used respectively for uplink and downlink communications. For the LTE communications system, the OFDM scheme is used in conjunction with a Frequency Division Duplexing (FDD) system, where transmission and reception takes place simultaneously albeit at different frequency bands, for example a system transmission band and a system reception band. In this type of system, the power of transmitted signals is up to 120 dB higher than the power of signals expected for reception by the receiver chain. Consequently, it is necessary to design a highly sensitive receiver chain that is capable of isolating the received signals in the presence of the transmitted signals. In the present context, the sensitivity of the receiver chain is the lowest power of a given signal that can be received successfully. In this respect, the sensitivity is determined by the architecture and design of the receiver chain and the amount of noise generated in the receiver chain impacts upon the sensitivity of the receiver chain.

When implementing a transceiver in a communications system employing an FDD scheme, the transmitter chain and the receiver chain are separated by a duplexer. This duplexer is supposed to provide sufficient signal isolation between the transmitter chain and receiver chain, which are both coupled to the duplexer and simultaneously connect the transmitter chain and the receiver chain to an antenna.

A number of technologies exist to implement a suitable duplexer, but acoustic resonator circuits, such as Surface Acoustic Wave (SAW) filters or Bulk Acoustic Wave (BAW) filters, are typically the technology of choice used to serve as the duplexer and provide the required signal isolation between the transmitter chain and the receiver chain. However, it is understood that the properties of the resonator circuits vary due to tolerances in the manufacture of the resonator circuits. Additionally, the acoustic resonator circuits are prone to suffer from frequency drift as the resonator circuits age, which can affect the cut-off frequencies of the resonator circuit over its lifetime and hence a device, such as a duplexer, employing the resonator circuit. As such, this drift impacts negatively on the signal isolation provided by the duplexer. Electronic devices and circuits are also known to be prone to performance variations caused by variations in temperature. The resonator circuit is no different in this respect, and so performance of a duplexer manufactured using the resonator circuit is subject to variations in temperature.

Manufacturers of duplexers typically publish technical specification that indicate a minimum level of performance that a given duplexer will achieve. In many cases, the duplexer is capable of exceeding the minimum level of performance published. Nevertheless, a receiver chain for operation, for example, in accordance with the LTE standard is typically designed to support the minimum level of performance of the duplexer when designing to meet performance targets set by the LTE standard of the 3rd Generation Partnership Project (3GPP).

Consequently, as in US patent publication no. 2011/0299434, it has been recognised that when the duplexer can be identified to be performing above the minimum level of performance published by the manufacturer of the duplexer, RF processing components of the UE unit can be reconfigured to use less power while still providing wireless network access in accordance with the performance targets set by the communications standard in which the UE unit is intended to operate.

In relation to US patent publication no. 2011/0299434, this document discloses a UE unit arranged to provide network access in a Universal Mobile Telecommunications System (UMTS). As mentioned above, this document recognises that duplexers typically perform better than the minimum performance specification published by the manufacturer of the duplexer. Furthermore, this document discloses the setting of the transmitter chain of the UE unit to transmit data at a maximum permitted power level and then to measure signal leakage from the duplexer to the receiver chain. The techniques described embrace factory testing and opportunistic testing, whereby the subcomponents of the UE unit responsible for testing are described as performing measurements whilst the UE unit is in service and possibly transmitting traffic-related signals in the communications network. However, in such communications networks, transmit power is controlled by the Node B with which the UE unit is communicating and transmission by the UE unit of signals at power levels greater than the power level instructed by the Node B contravenes the UMTS standard and if applied in the context of the LTE standard would also contravene the LTE standard, because use of such elevated power levels can render the Node B/eNode B incapable of receiving signals from other Node B's/eNode B's in the communications network. The power consumption of the transceiver of the UE unit is described as being controlled by setting different sub-circuits to low-power modes based on signal leakage measurements made. The settings are predetermined and recorded in a look-up table having different settings for different parts of the transceiver.

BRIEF SUMMARY OF THE INVENTION

According to a first aspect of the present invention, there is provided a communications apparatus configured to provide wireless network access in accordance with a communications standard that specifies a transmit OFF power threshold requirement, the apparatus comprising: a hardware subsystem comprising a test signal control component, a duplexer component, and Radio Frequency processing components, the Radio Frequency processing components comprising: a transmitter chain portion having an output operably coupled to a transmit side port of the duplexer component; and a receiver chain portion having a signal sensitivity threshold associated and is operably coupled to a receive side port of the duplexer component; wherein the test signal control component is arranged to cooperate with the transmitter chain to generate a test signal, a portion of the test signal being leakable by the duplexer component from the transmit side port to the receive side port thereof; and the test signal control component is configured to ensure that any irradiated power of the test signal complies with the transmit OFF power threshold requirement and the portion of the test signal leaked is above the signal sensitivity threshold of the receiver chain portion.

The hardware subsystem may comprise an electromagnetic radiation transmission state and an electromagnetic radiation non-transmission state; the non-transmission state may have an irradiated power ceiling value associated therewith constituting a transmit OFF power threshold.

The apparatus may further comprise: an antenna; wherein the test signal control component may be arranged to generate a non-irradiation control signal prior to generation of the test signal.

The hardware subsystem may be arranged to decouple the antenna from the duplexer component in response to the non-irradiation control signal.

The apparatus may further comprise: another duplexer component; wherein the hardware subsystem may be arranged to couple the antenna to the another duplexer component instead of the duplexer component in response to the non-irradiation control signal.

The test signal control component may be arranged to cooperate with the transmitter chain in order to generate a tone signal as the test signal.

The test signal control component may be arranged to cooperate with the transmitter chain in order to generate a spread-spectrum signal as the test signal.

The test signal control component may be arranged to cooperate with the receiver chain in order to control reception of the test signal by the receiver chain by the receiver chain.

The test signal control component may be arranged to configure the receiver chain so that a receive carrier frequency setting of the receiver chain may be offset relative to a transmit carrier frequency of the test signal.

The hardware subsystem may further comprise a signal strength measurement component; and the test signal control component may be arranged to cooperate with the signal strength measurement component in order to measure a receive signal power in respect of the test signal as received by the receiver chain.

The test signal control component may be arranged to cooperate with the transmitter chain in order to generate a plurality of test signals in respect of a plurality of transmit carrier frequencies within a system transmission bandwidth, and to cooperate with the signal strength measurement component in order to measure leaked signal power in respect of each of the plurality of transmit carrier frequencies.

The test signal control component may be arranged to cooperate with the transmitter chain to sweep the frequency of the test signal through the transmit carrier frequencies of the system transmission bandwidth.

The test signal control component may be arranged to generate a profile of signal leakage representing power of signals leaked by the duplexer component in respect of each of the plurality of transmit carrier frequencies.

The hardware subsystem may have a default set of operational parameter settings and a non-default set of operational parameter settings associated therewith in relation to operation of the hardware subsystem, and the non-default set of operational parameter settings may have associated therewith a reduced power consumption over the default set of operational parameter settings.

The test signal control component may be arranged to analyse the profile of signal leakage and use relative differences in measured leaked signal power between carrier frequencies in order to determine whether to apply the non-default set of operational parameter settings on a per carrier frequency basis.

The test signal control component may be arranged to analyse the profile of signal leakage and to select a lowest measured leaked signal power therefrom and to assign the non-default set of operational parameter settings to transmit carrier frequencies having measured signal leakage power complying with a predetermined power margin criterion relative to the lowest measured leaked signal power.

The lowest measured signal leakage power may be assumed to correspond to a minimum isolation value supported by the duplexer component as specified by a manufacturer of the duplexer component.

The predetermined power margin criterion may be any leaked signal power that is above a predetermined power margin of the lowest measured signal leakage power.

The apparatus may further comprise a data store arranged to store a plurality of reference receiver gain values in respect of a plurality of respective receive carrier frequencies and a plurality of reference transmitter power values in respect of a plurality of respective transmit carrier frequencies.

The test signal control component may be arranged to access the data store and to use in respect of a selected carrier frequency: a reference receiver gain value of the plurality of reference receiver gain values; a reference transmitter power value of the plurality of reference transmitter power values; and a measured leaked signal power of the plurality of measured leaked signal power; in order to generate an estimate of isolation of the duplexer component at the selected transmit carrier frequency.

The hardware subsystem may have a default set of operational parameter settings and a non-default set of operational parameter settings associated therewith in relation to operation of the hardware subsystem, and the non-default set of operational parameter settings may have associated therewith a reduced power consumption over the default set of operational parameter settings.

The hardware subsystem may be arranged to assign the non-default set of operational parameter settings in respect of the selected carrier frequency in response to the estimate of isolation of the duplexer component complying with a predetermined power margin criterion; the predetermined power margin criterion may be set to permit advantage to be taken of a minimum isolation value specified by a manufacturer of the duplexer component.

The hardware subsystem may support Orthogonal Frequency Division Multiplexing according to a Long-Term Evolution wireless communications standard.

According to a second aspect of the present invention, there is provided a user equipment unit comprising the communications apparatus as set forth above in relation to the first aspect of the invention.

According to a third aspect of the present invention, there is provided a communication system comprising the communications apparatus as set forth above in relation to the first aspect of the invention.

According to a fourth aspect of the present invention, there is provided a method of determining a signal leakage profile of a duplexer component in a communications apparatus arranged to provide wireless network access in accordance with a communications standard that specifies a transmit OFF power threshold requirement, the method comprising: a test signal control component controlling generation of a test signal; a transmitter chain portion generating the test signal in response to the test signal control component; the test signal propagating to the duplexer component; a receiver chain portion having a signal sensitivity threshold associated therewith receiving a portion of the test signal leaked from the duplexer component in response to the test signal being applied to the duplexer component; and a signal strength measurement component measuring the leaked signal power received by the receiver chain portion; wherein the test signal control component ensures that any irradiated power of the test signal complies with the transmit OFF power threshold requirement and a portion of the test signal leaked is above the signal sensitivity threshold of the receiver chain portion.

The method may further comprise: repeating the generation of the test signal and measurement thereof in respect of a plurality of transmit carrier frequencies within a system transmission bandwidth.

According to a fifth aspect of the present invention, there is provided a method of assigning a set of operational parameter settings, the method comprising: identifying a lowest measured leaked signal power from a signal leakage profile determined using the method of determining the signal leakage profile as set forth above in relation to the fourth aspect of the invention; selecting a transmit carrier frequency; and determining whether a measured leaked signal power associated with the selected transmit carrier frequency complies with a predetermined power margin criterion relative to the lowest measured leaked signal power.

According to a sixth aspect of the present invention, there is provided a method of assigning a set of operational parameter settings, the method comprising: accessing a reference transmit power value; accessing a reference receive chain gain value; selecting a transmit carrier frequency; generating a signal leakage profile using the method of determining a signal leakage profile as set forth above in relation to the fourth aspect of the invention; and estimating an isolation value in respect of operation of the duplexer component at the selected transmit carrier frequency using the measured signal power at the selected transmit carrier frequency, the reference transmit power value, and the reference receiver gain value.

The method may further comprise: assigning a non-default set of operational parameter settings in respect of the selected transmit carrier frequency in response to the estimate of the isolation value complying with a predetermined power margin criterion arranged to take advantage of signal isolation headroom relative to a minimum manufacturer specified isolation value; wherein the non-default set of operational parameter setting may have associated therewith a reduced power consumption over a default set of operational parameter settings.

It is thus possible to provide an apparatus, method and system that supports in-field testing of the isolation capability of a duplexer in order to determine whether alternative device settings can be employed in order to reduce power consumption by the apparatus. Furthermore, measurements are made in a manner that is compliant with signal irradiation requirements of a communications standard, for example the LTE standard, in order to avoid interfering with the communication of other equipment in the network.

BRIEF DESCRIPTION OF THE DRAWINGS

At least one embodiment of the invention will now be described, by way of example only, with reference to the accompanying drawings, in which.

DETAILED DESCRIPTION OF THE INVENTION

Figure 1:
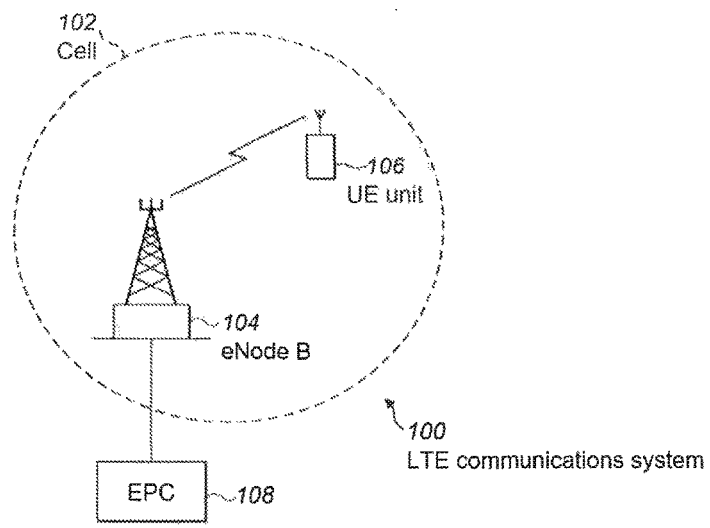
FIG. 1 is a schematic diagram of a user equipment unit operating in a part of a communications network.

Throughout the following description identical reference numerals will be used to identify like parts.

Referring to FIG. 1, in a wireless communications system, for example a Long Term Evolution (LTE) communications system 100, a communications network is supported by a plurality of cells arranged to provide wireless communications access over a geographic region. In this example, only a single cell is shown for the sake of simplicity and conciseness of description. However, the skilled person will appreciate that a greater number of cells is usually deployed throughout the communications network. In this respect, a cell 102 is supported by a base station, referred to as an evolved Node B (eNode B) 104 in the context of the LTE communications system 100. The eNode B 104 is capable of communicating wirelessly with a communications apparatus, for example a User Equipment (UE) unit 106, over an air interface. The eNode B 104 is operably coupled to an Evolved Packet Core (EPC) 108. However, since the examples set forth herein concern the UE unit 106, for the sake of clarity and conciseness of description, further details of the wireless communications network infrastructure will not be described herein. Furthermore, whilst the examples set forth herein are described in the context of the LTE communications system 100, the skilled person will appreciate that the examples are applicable to other kinds of communications networks that operate in accordance with the Orthogonal Frequency Division Multiplexing (OFDM) communications scheme, for example communications networks operating in accordance with the Worldwide Interoperability for Microwave Access (WiMAX) communications standard and the WiFi standard (IEEE 802.11).

In this example, the LTE standard specifies a so-called transmit OFF power threshold requirement. This is a power level that is defined as a maximum transmit power that a UE unit can irradiate when the device is in a non-transmitting or OFF state. According to section 6.3.3 of 3GPP 36.101 v12.5.0, the transmitter is considered to be in the OFF state when the UE unit is not allowed to transmit or during periods when the UE unit is not transmitting a sub-frame. During discontinuous transmission and so-called "measurements gaps", the UE unit is not considered to be in the OFF state. One example of when the UE unit is considered to be in the OFF state is when the UE unit is not participating in generation of network traffic. The threshold is set in order to ensure that spurious emissions from UE units into the network do not interfere with legitimate network traffic signals. The transmit OFF power is quantified as the mean power in a duration of at least one subframe, excluding any transient periods and, according to Table 6.3.3.1-1 of the above-mentioned part of the LTE standard, the transmit OFF power must not exceed a power level of −50 dBm.

Figure 2:
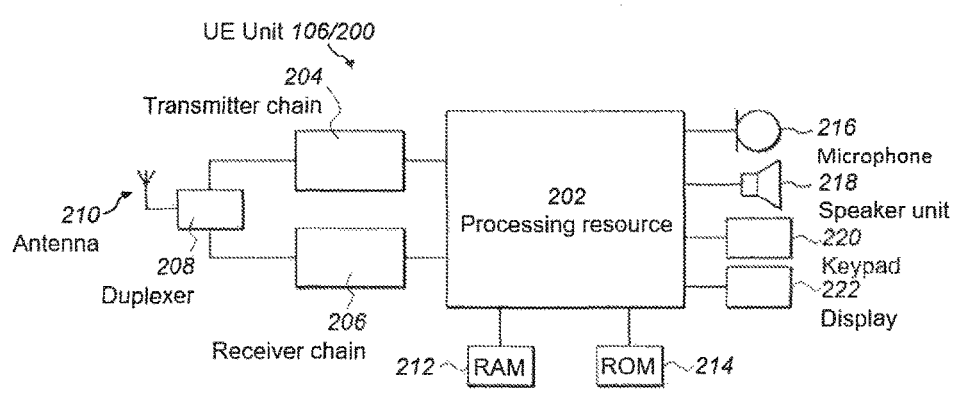
FIG. 2 is a schematic diagram of a user equipment device of FIG. 1 constituting an embodiment of the invention.

Turning to FIG. 2, the user equipment (UE) device 106/200 operating in an LTE communications system, comprises a processing resource 202, the processing resource 202 being, in this example, a chipset of a cellular communications terminal. The processing resource 202 is coupled to a transmitter chain 204 and a receiver chain 206, the transmitter and receiver chains 204, 206 being coupled to a duplexing component 208, hereinafter referred to as a "duplexer" 208. The duplexer 208 is coupled to an antenna 210.

The UE unit 200 also possesses a volatile memory, for example a RAM 212, and a non-volatile memory, for example a ROM 214, each coupled to the processing resource 202. The processing resource 202 is also coupled to a microphone 216, a speaker unit 218, a keypad 220 and a display 222. The skilled person should appreciate that the architecture of the UE unit 200 described above comprises other elements, for example multiple antennae, but such additional elements have not been described in detail herein for the sake of preserving conciseness and clarity of description.

The transmitter chain 204 and the receiver chain 206 are supported by a hardware subsystem. The transmitter chain 204 and the receiver chain 206 are part of a transceiver, which is part of a modem of the UE unit 200. The modem is configured to provide wireless network access in accordance with the OFDM communications scheme, for example as defined in the LTE standard. In the examples set forth herein, the term modem should be understood to embrace any suitable signal modulation and/or demodulation apparatus capable of supporting operation in accordance with the OFDM communications scheme. The hardware subsystem is a collection of hardware and/or software elements that contributes, with other subsystems, to the transmitter chain 204 and/or a receiver chain 206.

Figure 3:
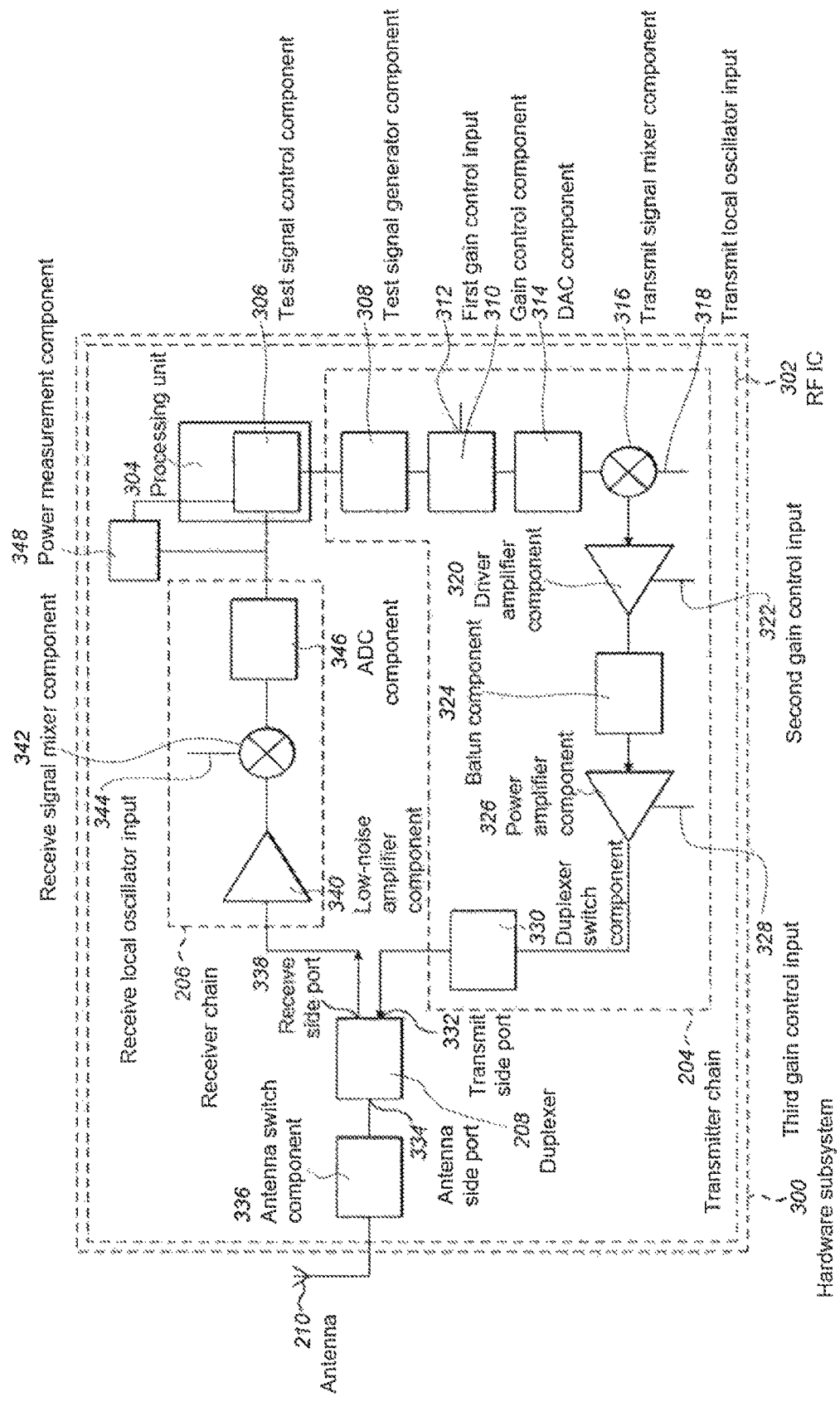
FIG. 3 is a schematic diagram of a part of a transceiver of the user equipment device of FIG. 1 in greater detail.

Referring to FIG. 3, the hardware subsystem 300, which is configured in accordance with the OFDM communications scheme, comprises a baseband Integrated Circuit (IC) (not shown) and a Radio Frequency (RF) IC 302 to support the transmitter chain 204 and the receiver chain 206. Although, in this example, two separate ICs are employed, namely the baseband IC and the RF IC 302, the skilled person will appreciate that other implementations are possible in which the RF and baseband processing is performed in a single IC. A digital interface (not shown) is provided between the baseband IC and the RF IC 302 for communication therebetween. The RF IC 302 is an example of RF processing components and comprises functional components, arranged in stages. Similarly, although not shown, the baseband IC is an example of baseband processing components and comprises functional components arranged in stages. For a receiver chain, these baseband processing components process an incoming OFDM signal after it has been translated from being centred about a carrier frequency to being about a baseband range of frequencies, i.e. to a range of frequencies in which the carrier frequency has been remove. For a transmitter chain, the opposite applies, namely that a signal in the baseband range of frequencies, prior to being translated to the analogue domain and up-converted onto a carrier frequency, is processed by these components. For a receiver chain, the RF processing components are functional components that are arranged in stages to down-convert a received OFDM signal down to the baseband range of frequencies. For a transmitter chain, these are functional components arranged to modulate a received digital signal centred about a baseband range of frequencies onto a carrier signal. The digital interface is an interface between the baseband processing components and the RF processing components, which is subject to minimal specification under the LTE standard and provided to communicate digital data, for example, between the baseband processing components and the RF processing components in support of the OFDM communications scheme.

In this, and other examples set forth herein, only a portion of the RF processing is described, because other components of the RF processing would be readily understood by the skilled person but have no bearing on the understanding of the inventive concepts expounded in the examples set forth herein. Consequently, such components will not be described in further detail herein. The examples set forth herein are therefore only described in the context of a test signal generation component, signal up-conversion, down-conversion, modulation and demodulation components. In this respect, the hardware subsystem 300 comprises a processing resource 304, for example a processing unit, such as an ARM® core processor, operably coupled to a portion of the transmitter chain 204 and a portion of the receiver chain 206. The processing unit 304 supports a test signal control component 306.

An input of the portion of the transmitter chain 204, which is operably coupled to the processing unit 304, and is capable of communicating with the test signal control component 306, is operably coupled to a test signal generator component 308 having an output that is operably coupled to an input of a gain control component 310; the gain control component 310 is, in this example, an digital gain component and has a first gain control input 312. In this example, the test signal generator 308 is a tone generator that generates a baseband tone. However, the skilled person should appreciate that other kinds of signal can be generated to serve as test signals, for example a spread-spectrum signal, and so different waveforms are contemplated. Similarly, the test signal generator component 308 can comprise or be operably coupled to a memory (not shown) that stores pre-programmed samples, which can serve as the test signal for transmission at an appropriate data rate. Similarly, a programmable Digital Signal Processor (DSP) can be employed.

An output of the gain control component 310 is operably coupled to an input of a Digital-to-Analogue Converter (DAC) component 314, an output of the DAC component 314 being operably coupled to a transmit signal input of a transmit signal mixer component 316. The transmit signal mixer component 316 has a transmit local oscillator input 318 for receiving a transmit local oscillator signal. An output of the transmit signal mixer component 316 is operably coupled to an input of driver amplifier component 320 having a second gain control input 322. In this example, the driver amplifier component 320 operates in the analogue domain. An output of the driver amplifier component 320 is operably coupled to an input of a balun component 324, an output of the balun component 324 being operably coupled to an input of a power amplifier component 326, which in this example also operates in the analogue domain. The power amplifier component 326 comprises a third gain control input 328 and an output that is operably coupled to an input a duplexer switch component 330. Although not shown, the hardware sub-components can comprise multiple duplexers to support wireless network access to different communications networks operating in different frequency bands. The duplexer switch component 330 therefore provides a facility to switch between different duplexers as required by the UE unit 200. An output of the duplexer switch component 330 is operably coupled to a transmit side port 332 of the duplexer 208. An antenna side port 334 of the duplexer 208 is operably coupled to a coupling port of an antenna switch component 336, another connection port of the antenna switch component 336 being operably coupled to the antenna 210. A receive side port 338 of the duplexer 208 is operably coupled to the receiver chain 206, which comprises a low-noise amplifier component 340 having an input operably coupled to the receive side port 338 of the duplexer 208. An output of the low-noise amplifier component 340 is operably coupled to a receiver signal input of a receive signal mixer component 342 having a receive local oscillator input 344 for receiving a receive local oscillator signal. An output of the receive signal mixer component 342 is operably coupled to an input of an Analogue-to-Digital Converter (ADC) component 346 and an output of the ADC component 346 is operably coupled to the processing unit 304 and, in particular, the test signal control component 306. A power measurement component 348 is operably coupled to the output of the ADC component 346 and, separately from the output of the ADC component 346, to test signal control component 306. In another implementation, the measurement of power can be provided in the processing unit 304.

Figure 4:
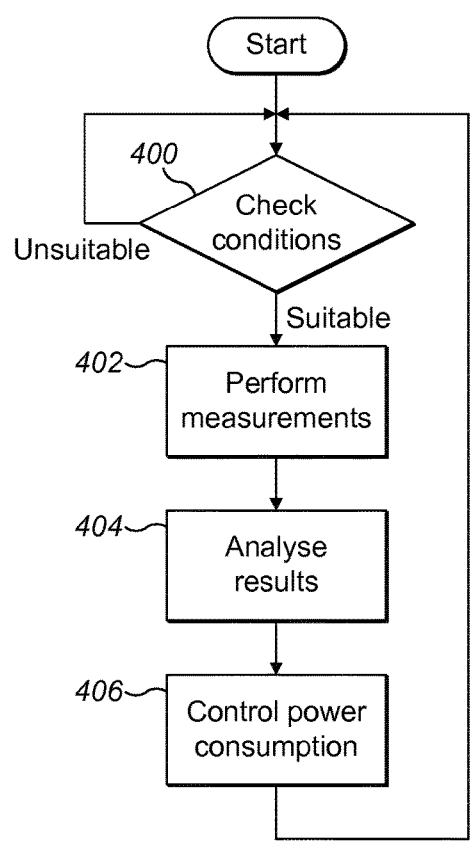
FIG. 4 is a flow diagram of a method of determining a signal leakage profile, in overview, employed by the communications apparatus of FIGS. 2 and 3 and constituting another embodiment of the invention.

Two different methods of assigning operational parameter settings of the hardware subsystem 300 will be described later below. The variants nevertheless conform to a high-level methodology, which will now be described with reference to FIG. 4.

In this respect, it should be appreciated that the assignment of the operational parameter settings is intended to be performed periodically, the frequency of performance of the assignment can be specific to design considerations of the manufacturer of the UE unit 200. Moreover, the assignment of operational parameter settings and indeed measurements required for such assignments are not intended solely to be implemented during factory testing of the UE unit 200 and can be employed "in the field", i.e. at times when the UE unit 200 is deployed in the communications network. To this end, the test signal control component 306 determines (Step 400) whether a situational condition of the UE unit 200 is satisfied that will permit testing to be performed without disrupting normal operation of the UE unit 200 and/or the communications network. In this example, the testing relates to isolation provided by the duplexer 208 by way of measurement of power at the receive side port 338 of the duplexer 208 corresponding to the signal applied at the transmit side port 332 of the duplexer 208, and this constitutes signal leakage power. The situational conditions can be, for example, when the UE unit 200 is in a factory, such as during factory testing, upon power-up of the UE unit 200 or at an opportunistic time when the transceiver of the UE unit 200 is not otherwise active, i.e. it is not involved in traffic-related communications operations, for example when the transmitter chain 204 is in the transmit OFF state. When the situational condition of the UE unit is determined to be unsuitable for measuring signal leakage power in respect of the duplexer 208, the test signal control component 306 continues to await a suitable opportunity to perform the measurement of the signal leakage power in respect of the duplexer 208. If, however, the UE unit 208 is determined to be in a situational condition compatible with performance of the measurements, for example an opportunity when the transceiver is not otherwise engaged in processing signal traffic, the test signal control component 306 can proceed to testing. For the sake of clarity and conciseness of description, the following examples will be described in the context of an opportunity arising, during use of the UE unit 200 in the field, for the performance of measuring signal leakage power in respect of the duplexer 208 when the transceiver is not engaged in processing traffic-related signals, because such a situation illustrates well the benefits of the embodiments set forth herein. However, the embodiments are applicable to the other situations described above, particularly but not exclusively upon power-up of the UE unit 200.

Once the test signal control component 306 has determined that testing can proceed, the test signal control component 306 initiates and controls (Step 402) the process of testing the signal leakage of the duplexer 208. Thereafter, measurements made and any predetermined or pre-stored data is analysed (Step 404) by the test signal control component 306 and then the test signal control component 306 either directly or indirectly implements (Step 406) operational parameter settings of the hardware subsystem 300 that results in a power consumption reduction by the hardware subsystem 300. For example, any suitable component or components of the hardware subsystem 300, such as the test signal control component 306 can implement a reduction in an operating voltage of a Voltage Controlled Oscillator (VCO) of the transmitter chain 204, thereby reducing the power consumption of the VCO. Another parameter that can be modified is an operating voltage of the low-noise amplifier component 340, because the receiver chain 206 receives less signal power attributable to the transmitter chain 204 as a result of a degree of isolation being achieved that is greater than an expected maximum degree of isolation and so the receiver chain 206 can operate in a mode of operation that exhibits less linearity. This can additionally or alternatively be achieved by reducing the calibration requirements of the receive signal mixer component 342.

Figure 5:
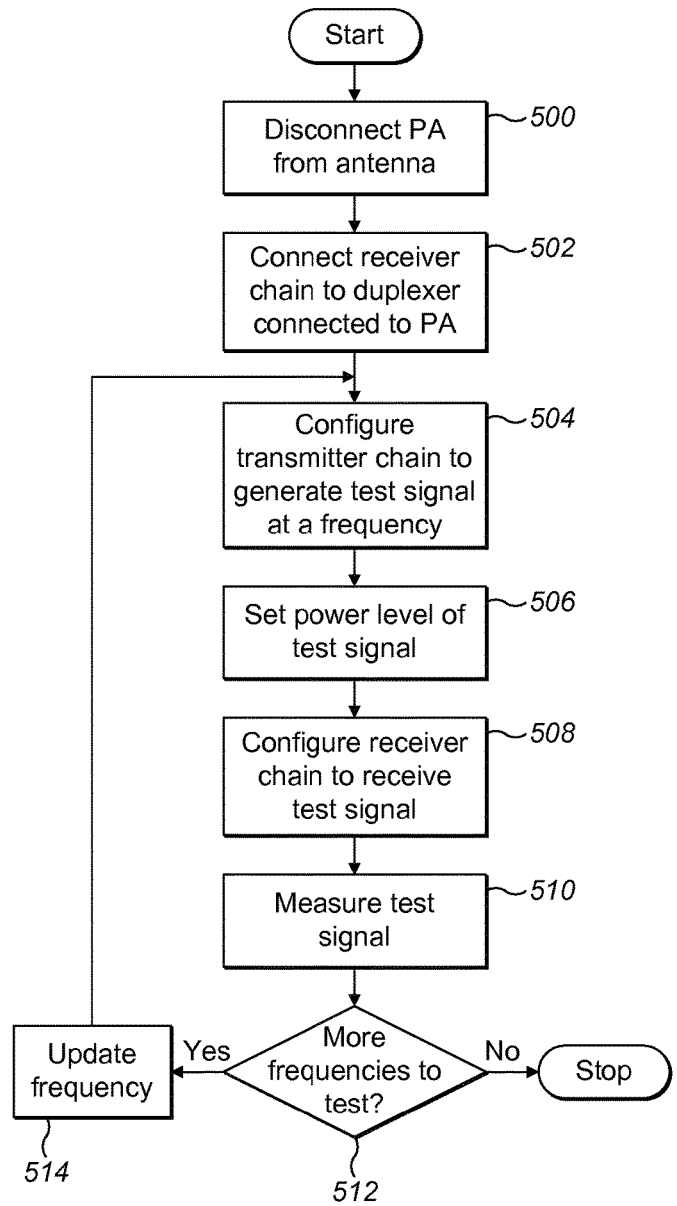
FIG. 5 is a flow diagram of the method of FIG. 4 in greater detail.

In relation to Step 402, and referring to FIG. 5, the test signal control component 306 performs measurement of signal power leakage power in a manner common to both methods of assigning operational parameter settings mentioned above. In this respect, the test signal control component 306 instructs the antenna switch 336 to disconnect (Step 500) the power amplifier component 326 from the antenna 210. In this example, the UE unit 200 is designed to operate in multiple frequency bands and so the disconnection of the power amplifier component 326 is achieved by the test signal control component 306 issuing a control signal to the duplexer switch component 330 to connect the power amplifier component 326 to the duplexer 208 and the antenna switch 336 to couple the antenna 210 to another duplexer (not shown). The test signal control component 306 then instructs (Step 502) the receiver chain 206 to connect to the duplexer 208, which is the duplexer under test. Although not shown in FIG. 3, the hardware subsystem 300 of this example comprises a multi-way switch in order to connect the transmitter chain 204 to different duplexer inputs and the receiver chain 206 to different duplexer outputs.

The test signal control component 306 then configures (Step 504) the test signal generator component 308 in respect of a test tone to be generated and serve as the test signal. In this example, the test signal is selected to be a tone signal, due to ease of generation and on account of the fact that the test signal can be received by the receiver chain 206 using a very narrow filter, thereby allowing the power of the test signal to be as low as possible. As mentioned above, though, the use of other signal types is envisaged, for example a spread-spectrum signal.

Prior measurements of irradiated power are made during laboratory measurements, product development tests, factory testing and/or on-chip calibration. Consequently, based upon the prior measurements made relating to irradiated power, gain parameters of the transmitter chain 204 are set (Step 506) by the test signal control component 306 in order to ensure that the power irradiated at the antenna 210 does not exceed the transmit OFF power threshold of the network mentioned above. In this respect, and in this example, a first setting is applied at the first gain control input 312 of the gain control component 310, a second setting is applied at the second gain control input 322 of the driver amplifier component 320 and a third setting is applied at the third gain control input 328 of the power amplifier component 326. Thereafter, the test signal control component 306 configures (Step 508) the receiver chain 206 in order to be able to measure the energy of the test signal present at the receive side port 338 of the duplexer 208. In some examples, it can be desirable to offset the receive local oscillator frequency from the transmit local oscillator frequency and hence the receive carrier frequency from the transmit carrier frequency in order to avoid so-called Voltage Controlled Oscillator (VCO) pulling. Once the receiver chain 206 has been configured, the test signal control component 306 instructs the test signal generator component 308 to generate the test signal and the receiver chain 204 receives a leaked test signal, which is the part of the power of the test signal that is leaked from the transmit side port 332 to the receive side port 338 of the duplexer 208 due to limitations in the isolation of the transmit side port 332 from the receive side port 338 provided by the duplexer 208. The power measurement component 348 then measures (Step 510) the leaked test signal received by the receiver chain 206, for example by a process of squaring digital samples communicated from the ADC component 346 to the test signal control component 306 and accumulating the results. In this respect, measurement duration and bandwidth of the measurement frequency are selected in advance as a result of experimentation and measurement in order to achieve a balanced trade-off between measurement duration and filter bandwidth, i.e. the ability to distinguish between the test signal and background noise.

In this example, the frequency of the test signal is swept through a range of transmit carrier frequencies within the transmission and reception frequency bands employed by the UE unit 200 in accordance with the LTE or other standards. Consequently, the test signal control component 306 determines (Step 512) whether the frequency of the test signal has been swept through all carrier frequencies at which the tested signal is to be generated and if the test signal still needs to be generated in respect of one or more test frequencies, the test signal control component 306 updates (Step 514) the frequency to be used by the test signal generator component 308 and the above steps of configuring the test signal generator 308, setting the power level of the test signal, configuring the receiver chain 206 and measuring signal leakage (Steps 504 to 510) are repeated until, in this example, testing on all carrier frequencies in the system transmit bandwidth has been completed. By sweeping through a range of carrier frequencies, a profile is obtained of signal leakage power vs. frequency.

Figure 6:
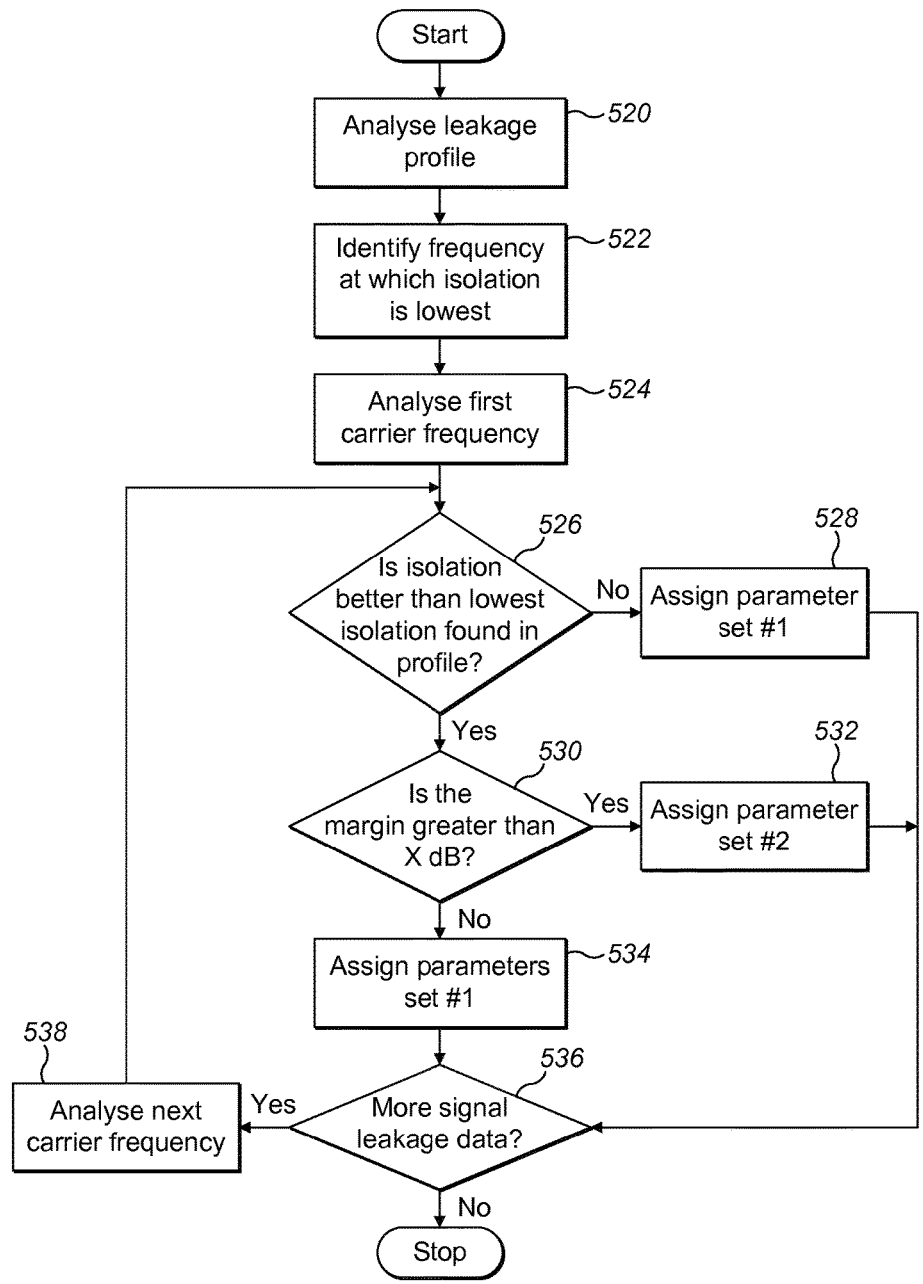
FIG. 6 is a flow diagram of a first method of assigning a set of operational parameter settings using the profile generated using the method of FIGS. 3 and 4 in order to save power and constituting yet another embodiment of the invention.

Turning to FIG. 6, the measurements made as described above in relation to FIG. 5 can be used in a first method of assigning operational parameter settings mentioned above. In this example, the test signal control component 306 analyses (Step 520) the profile of the measured signal leakage power with carrier frequency in order to determine (Step 522) the frequency at which signal leakage power is highest amongst all the measurements of the profile. In order to use the signal leakage power measurement data, the operation of the test signal control component 306 is based upon a first assumption that the signal isolation provided by the duplexer 208 in practice exceeds a worst case level of isolation specified by the manufacturer of the duplexer 208, and a second assumption that the hardware subsystem 300 is designed to operate in accordance with the LTE standard when the isolation of the duplexer 208 is at the worst case level indicated by the specification of the manufacturer of the duplexer 208.

The test signal control component 306 then proceeds to analyse the signal leakage power measurements of the profile. In this respect, the test signal control component 306 analyses (Step 524) a first signal leakage power in respect of the first carrier frequency and determines (Step 526) whether the first signal leakage power at the first carrier frequency is better, i.e. lower, than the highest signal leakage power level found previously. In this example, this step is employed to address a situation where the highest signal leakage level found is being compared with itself. However, the skilled person will appreciate that this step can be omitted with the use of, for example, suitable software code in order to avoid the possibility of self-comparison in the method.

If the level of signal leakage power in respect of the first carrier frequency is not lower than the highest signal leakage power level found, the test signal control component 306 assigns (Step 528) a default set of operational parameter settings for the subsystem 300 for transmission of RF signals at the first carrier frequency. In this respect, the default set of operational parameter settings can include settings relating to one or more of the gain control component 310, the driver amplifier component 320 and the power amplifier component 326. The test signal control component 306 then determines (Step 536) whether other carrier frequencies of the profile require assignment of a set of operational parameter settings, as will be described later herein in greater detail.

Alternatively, if the level of signal leakage power in respect of the first carrier frequency is lower than the highest signal leakage power level found, the test signal control component 306 determines (Step 530) whether the level of signal leakage power in respect of the first carrier frequency is lower than the highest level of signal leakage power found by a predetermined margin, for example 5 dB. If the predetermined margin is met or exceeded, the test signal control component 306 assigns (Step 532) a non-default set of operational parameters for the subsystem 300 for transmission of RF signals at the first carrier frequency. In this respect, the non-default set of operational parameter settings can include settings relating to one or more of the gain control component 310, the driver amplifier component 320 and the power amplifier component 326. The non-default set of operational parameters constitute settings that take advantage of the fact that the duplexer 208 is considered capable of operating with an isolation level greater than that specified by the manufacturer and so the subsystem 300 can be configured to operate in a manner that reduces power consumption by the subsystem 300 on account of the better than specified performance of the duplexer 208. If the predetermined margin has not been met by the level of signal leakage power measured in respect of the first carrier frequency, the test signal control component 306 assigns (Step 534) the default set of operational parameters for transmission of RF signals at the first carrier frequency. This is an example of evaluation of a predetermined power margin criterion.

The test signal control component 306 then determines (Step 536) whether more signal leakage power measurement data remains to be analysed. In the event that more signal leakage power measurement data remains, the test signal control component 306 continues and analyses (Step 538) a signal leakage power measurement associated with a subsequent carrier frequency and executes the assessments in the manner described above in relation to the measured signal leakage power in respect of the first carrier frequency (Steps 526 to 536).

Figure 7:
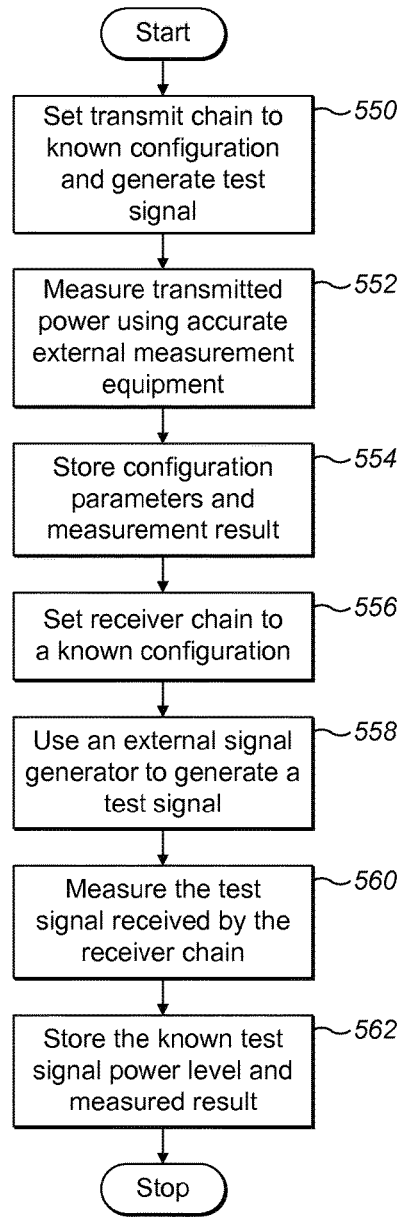
FIG. 7 is a flow diagram of a method of generating reference values for use in a second method of assigning a set of operational parameter settings.

In another method of assigning operational parameter settings (FIG. 7), it is necessary, as a first stage in a two stage process, for measurements to be made in a factory or laboratory environment in order to translate the signal leakage power measurements of the profile described above to absolute signal leakage power measurements that can be used to estimate signal isolation by the duplexer 208. In this respect, in the factory, for example during a test phase of the manufacturing process for the UE unit 200, the transmitter chain 204 is configured (Step 550) using known parameter settings and the test signal generator 308 is instructed to generate a test signal. The transmitted test signal is measured (Step 552) using an accurate external measurement apparatus employing any suitable known measurement technique, for example measuring transmitted power that reaches a representative electrical load used in place of the antenna 210. The test signal control component 306 is then provided with the transmitter chain configuration parameters and associated measurement results for storage (Step 554) for subsequent use. Subsequently, the receiver chain 206 is configured (Step 556) using known configuration parameters. Using an external signal generator in place of the antenna 210, a test signal is generated (Step 558) having a precisely known power level. The accurate test signal generated external to the UE unit 200 as received by the receiver chain 206 is measured (Step 560) by the power measurement component 348.

The accurately known test signal power level and the associated measurement thereof are provided to the test signal control component 306 for storage (Step 562) and subsequent use.

Figure 8:
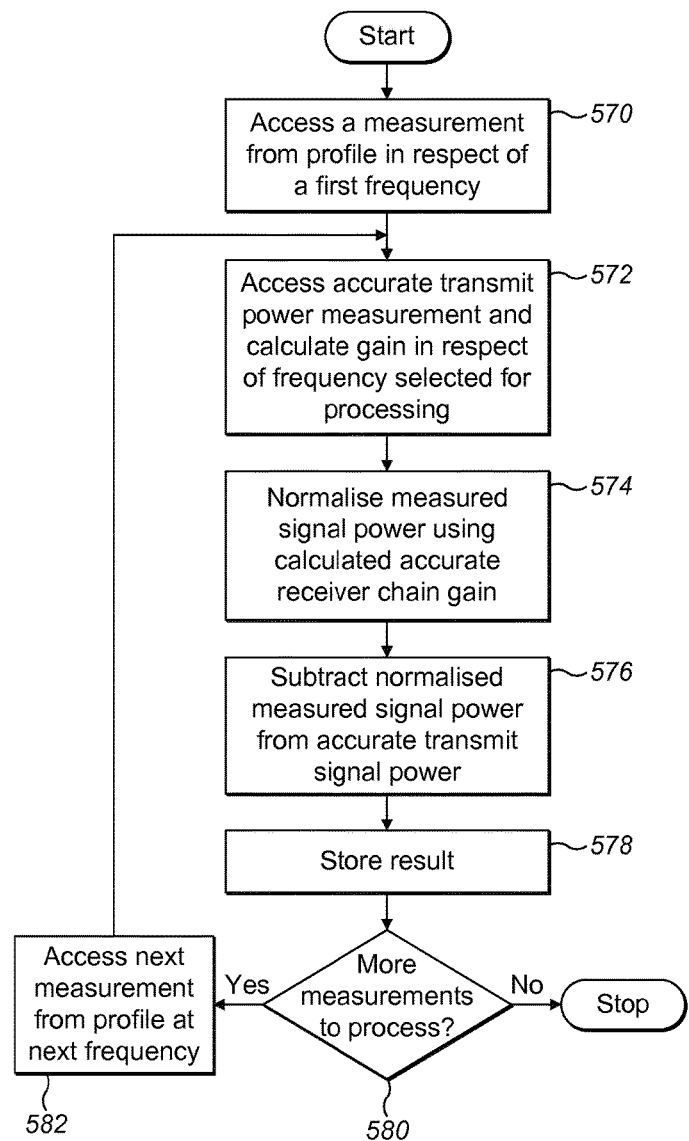
FIG. 8 is a flow diagram of a first part of the second method of assigning a set of operational parameter settings using the profile generated using the method of FIG. 4 and constituting a part of a further embodiment of the invention.

In the second stage of the process (FIG. 8), the signal leakage power measurements made to generate the signal leakage profile, which are simply measurements of power of received leaked signals varying with frequency, are converted to absolute values using the measurements made as described above in relation to FIG. 7. In this respect, the measured signal leakage powers stored against changes in frequency simply provide a profile of relative values without a point of reference.

Consequently, the test signal control component 306 accesses (Step 570) a measured signal leakage power level from the profile in respect of a first carrier frequency in the profile. The test signal control component 306 then accesses (Step 572), in respect of the carrier frequency of the accessed measured signal leakage power value, the precisely measured transmit power that was measured in the factory and then calculates the gain of the receiver chain 206 using the measurements made in the factory with accurate measurement apparatus. Thereafter, the test signal control component 306 uses the calculated gain of the receiver chain 206 to normalise (Step 574) the measured signal leakage power level in order to obtain a more accurate measurement, albeit still an estimate, of the measured signal leakage power level at the first carrier frequency.

Then, using the accurate measurement of the transmitted power retrieved, the test signal control component 306 subtracts (Step 576) the normalised measured signal leakage power from the accurate measurement of the test signal power in order to yield an estimate of the isolation of the duplexer 208 in respect of the first carrier frequency. The estimated isolation value and the frequency to which it corresponds is then stored (Step 578) by the test signal control component 306. Thereafter, the test signal control component 306 determines (Step 580) whether more measurements need to be converted to absolute isolation estimates in respect of other carrier frequencies. If other power measurements in respect of other respective carrier frequencies need to be processed, the test signal control component 306 access (Step 582) the next measured signal leakage power in respect of the next carrier frequency to be processed and the above process (Steps 572 to 580) of using accurate measurements to generate an estimate of absolute isolation of the duplexer 208 at a respective carrier frequency is performed until no further signal leakage power measurements need to be converted to absolute isolation estimates.

Figure 9:
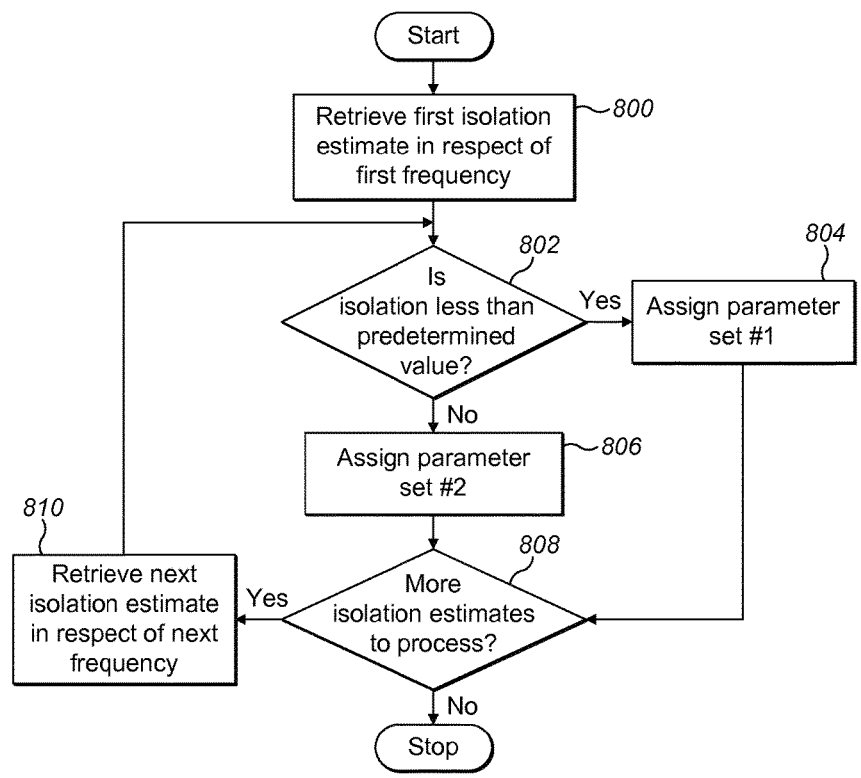
FIG. 9 is a flow diagram of a second part to the first part of the second method of FIG. 8 and also constituting another part of the further embodiment of the invention.

Turning to FIG. 9, having converted the measured signal leakage power levels in the profile to estimates of absolute isolation of the duplexer 208, the test signal control component 306 next assigns operational parameter sets to each of the carrier frequencies based upon the isolation estimate associated with the carrier frequency. In this respect, the test signal control component 306 accesses (Step 800) the first isolation estimate stored in respect of the first carrier frequency of the profile and determines (Step 802) whether the isolation estimate is below or equal to a predetermined threshold value. This is another example of evaluation of a predetermined power margin criterion. In such cases where the isolation estimate is below or equal to the predetermined threshold value, the isolation estimated is considered to be sufficiently close to the minimum isolation specified by the manufacturer of the duplexer 208 not to merit employing operational parameter settings in the hardware subsystem 300 to try to reduce power consumption by the hardware subsystem 300. Consequently, the test signal control component 306 assigns (Step 804) the default set of operational parameter settings for when the transmit chain 204 uses the first carrier frequency. The test signal control, component 306 the proceeds to determine (Step 808) whether more carrier frequencies need to have operational parameter settings assigned to them, as will be described in further detail hereinbelow. Otherwise, if the estimated isolation fails to satisfy the predetermined power margin criterion, the estimated isolation value must, by implication, exceed the predetermined threshold value and so the test signal control component 306 assigns (Step 806) a non-default set of operational parameter settings for the hardware subsystem 300 in order to reduce power consumption by the hardware subsystem 300 when the transmit chain 204 uses the first carrier frequency. Thereafter, the test signal control component 306 determines (Step 808) whether more carrier frequencies need to have operational parameter settings assigned to them. In the event that more carrier frequencies need operational parameter settings assigned, the test signal control component 306 retrieves (Step 810) a next isolation estimate in respect of a next carrier frequency of the profile and the above process (Steps 802 to 808) of assessing the estimated isolation of the duplexer 208 and assigning appropriate sets of operational parameter settings is performed until no further carrier frequencies in the profile need assignment of operational parameter settings.

The skilled person should appreciate that the above-described implementations are merely examples of the various implementations that are conceivable within the scope of the appended claims. Indeed, the skilled person should appreciate that descriptions herein of the default and non-default sets of operational parameter settings should not be considered as the only sets of operational parameter settings that can be employed. In this regard, a greater number of sets of operational parameter settings can be provided, each having differing degrees of power consumption associated therewith and the profile data can be assessed with a greater number of threshold values and different sets of operational parameter settings can be assigned by the test signal control component 306 depending upon the degree of increased isolation provided by the duplexer 208 at a respective carrier frequency relative to the minimum isolation specified by the manufacturer of the duplexer 208.

It should also be appreciated that a set of parameters can comprise one or more parameters. Furthermore, as indicated above in relation to the default set of operational parameters and the non-default set of operational parameters, the number of parameters and the nature of the parameters, for example analogue or digital, can be selected depending upon implementation practicalities.

It should also be appreciated that references herein to duplexers are not intended to be limiting in respect of a particular design or technology to achieve frequency segregation of signals and any suitable component is contemplated that can provide sufficient signal isolation between the transmitter chain and receiver chain, which are both coupled to the duplexer and simultaneously connect the transmitter chain and the receiver chain to an antenna, for example a so-called "hybrid junction".

In the examples described above, the antenna 210 can be coupled to any of a number of available duplexing components depending upon a desired frequency band of operation of the UE unit 200 and so decoupling of the antenna 210 from a duplexing component to be tested can be achieved by coupling the antenna 210 to a different duplexing component that is not being tested. However, in another embodiment, the antenna switch component 336 can be configured to create an open circuit between a duplexing component being tested and the antenna 210, for example where hardware subsystem 300 comprises a single duplexing component. Alternatively, where the antenna 210 cannot be decoupled from the duplexing component 208, it is necessary to set appropriate adjustable parameters of the transmit chain 204 to generate the test signal so as to have a power level that does not result in the transmit OFF threshold being exceeded when the test signal is irradiated by the antenna 210.

For the avoidance of doubt, use of the term "downlink" refers to communications from an eNode B to a UE unit. The UE unit 200 therefore possesses, in the examples set forth herein, a downlink receiver chain. Similarly, use of the term "uplink" refers to communications from a UE unit to an eNode B. The UE unit 200 therefore possesses, in the examples set forth herein, an uplink transmitter chain.

Although the above examples have been described in the context of the LTE communications standard, the skilled person should appreciate that the examples set forth herein are applicable to any communications standard that employs a maximum transmit OFF power threshold requirement.

The systems and methods of the above embodiments may be implemented in a computer system (in particular in computer hardware or in computer software) or in specifically manufactured or adapted integrated circuits, in addition to the structural components and user interactions described.

The methods of the above embodiments may be provided as computer programs or as computer program products or computer readable media carrying a computer program which is arranged, when run on a computer or other processor, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While specific examples of the invention have been described above, the skilled person will appreciate that many equivalent modifications and variations are possible. Accordingly, the exemplary embodiments of the invention set forth above are considered to be illustrative and not limiting. Various changes to the described embodiments may be made without departing from the spirit and scope of the invention.

The invention claimed is:

1. A communications apparatus configured to provide wireless network access in accordance with a communications standard that specifies a transmit OFF power threshold requirement, the apparatus comprising:

a hardware subsystem comprising a test signal control component, a duplexer component, and Radio Frequency processing components, the Radio Frequency processing components comprising:
  a transmitter chain portion having an output operably coupled to a transmit side port of the duplexer component; and
  a receiver chain portion having a signal sensitivity threshold associated and is operably coupled to a receive side port of the duplexer component;
wherein
  the test signal control component is arranged to cooperate with the transmitter chain to generate a test signal, a portion of the test signal being leakable by the duplexer component from the transmit side port to the receive side port thereof; and
  the test signal control component is configured to ensure that any irradiated power of the test signal complies with the transmit OFF power threshold requirement and the portion of the test signal leaked is above the signal sensitivity threshold of the receiver chain portion.

2. The apparatus according to claim 1, wherein the hardware subsystem comprises an electromagnetic radiation transmission state and an electromagnetic radiation non-transmission state, the non-transmission state having an irradiated power ceiling value associated therewith constituting a transmit OFF power threshold.

3. The apparatus according to claim 1, further comprising:
an antenna; wherein
  the test signal control component is arranged to generate a non-irradiation control signal prior to generation of the test signal.

4. The apparatus according to claim 3, wherein the hardware subsystem is arranged to decouple the antenna from the duplexer component in response to the non-irradiation control signal.

5. The apparatus according to claim 4, further comprising:
another duplexer component; wherein
  the hardware subsystem is arranged to couple the antenna to the another duplexer component instead of the duplexer component in response to the non-irradiation control signal.

6. The apparatus according to claim 1, wherein the test signal control component is arranged to cooperate with the transmitter chain in order to generate a tone signal as the test signal.

7. The apparatus according to claim 1, wherein the test signal control component is arranged to cooperate with the transmitter chain in order to generate a spread-spectrum signal as the test signal.

8. The apparatus according to claim 1, wherein the test signal control component is arranged to cooperate with the receiver chain in order to control reception of the test signal by the receiver chain.

9. The apparatus according to claim 1, wherein the hardware subsystem further comprises a signal strength measurement component; and the test signal control component is arranged to cooperate with the signal strength measurement component in order to measure a receive signal power in respect of the test signal as received by the receiver chain.

10. The apparatus according to claim 9, wherein the test signal control component is arranged to cooperate with the transmitter chain in order to generate a plurality of test signals in respect of a plurality of transmit carrier frequencies within a system transmission bandwidth, and to cooperate with the signal strength measurement component in order to measure leaked signal power in respect of each of the plurality of transmit carrier frequencies.

11. The apparatus according to claim 10, wherein the test signal control component is arranged to generate a profile of signal leakage representing power of signals leaked by the duplexer component in respect of each of the plurality of transmit carrier frequencies.

12. The apparatus according to claim 11, wherein the hardware subsystem has a default set of operational parameter settings and a non-default set of operational parameter settings associated therewith in relation to operation of the hardware subsystem, and the non-default set of operational parameter settings has associated therewith a reduced power consumption over the default set of operational parameter settings.

13. The apparatus according to claim 12, wherein the test signal control component is arranged to analyze the profile of signal leakage and use relative differences in measured leaked signal power between carrier frequencies in order to determine whether to apply the non-default set of operational parameter settings on a per carrier frequency basis.

14. The apparatus according to claim 13, wherein the test signal control component is arranged to analyze the profile of signal leakage and to select a lowest measured leaked signal power therefrom and to assign the non-default set of operational parameter settings to transmit carrier frequencies having measured signal leakage power complying with a predetermined power margin criterion relative to the lowest measured leaked signal power.

15. The apparatus according to claim 10, further comprising a data store arranged to store a plurality of reference receiver gain values in respect of a plurality of respective receive carrier frequencies and a plurality of reference transmitter power values in respect of a plurality of respective transmit carrier frequencies.

16. The apparatus according to claim 15, wherein the test signal control component is arranged to access the data store and to use in respect of a selected carrier frequency:
  a reference receiver gain value of the plurality of reference receiver gain values;
  a reference transmitter power value of the plurality of reference transmitter power values; and
  a measured leaked signal power of the plurality of measured leaked signal power;
in order to generate an estimate of isolation of the duplexer component at the selected transmit carrier frequency.

17. The apparatus according to claim 16, wherein the hardware subsystem has a default set of operational parameter settings and a non-default set of operational parameter settings associated therewith in relation to operation of the hardware subsystem, and the non-default set of operational parameter settings has associated therewith a reduced power consumption over the default set of operational parameter settings.

18. The apparatus according to claim 17, wherein the hardware subsystem is arranged to assign the non-default set of operational parameter settings in respect of the selected carrier frequency in response to the estimate of isolation of the duplexer component complying with a predetermined power margin criterion, the predetermined power margin criterion being set to permit advantage to be taken of a minimum isolation value specified by a manufacturer of the duplexer component.

19. The apparatus according to claim 1, wherein the hardware subsystem has a default set of operational parameter settings and a non-default set of operational parameter settings associated therewith in relation to operation of the hardware subsystem, and the non-default set of operational parameter settings has associated therewith a reduced power consumption over the default set of operational parameter settings.

20. A method of determining a signal leakage profile of a duplexer component in a communications apparatus, the method comprising:
  generating a test signal by a transmitter chain portion;
  transmitting the test signal to the duplexer component;
  receiving, by a receiver chain portion, a portion of the test signal leaked from the duplexer component in response to the test signal being applied to the duplexer component; and
  measuring a power of the portion of the test signal leaked from the duplex component, wherein
  an irradiated power of the test signal complies with a transmit OFF power threshold requirement and the portion of the test signal leaked from the duplex component is above a signal sensitivity threshold of the receiver chain portion.

* * * * *